(12) United States Patent
Kang et al.

(10) Patent No.: US 12,504,696 B2
(45) Date of Patent: Dec. 23, 2025

(54) METHOD FOR MONITORING PROCESS VARIATION INDEX

(71) Applicant: SAMSUNG ELECTRONICS CO., LTD., Suwon-si (KR)

(72) Inventors: Dahan Kang, Seongnam-si (KR); Youngseok Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 746 days.

(21) Appl. No.: 17/719,576

(22) Filed: Apr. 13, 2022

(65) Prior Publication Data

US 2022/0397829 A1    Dec. 15, 2022

(30) Foreign Application Priority Data

Jun. 10, 2021    (KR) .................. 10-2021-0075512

(51) Int. Cl.
*G03F 7/00*    (2006.01)
*G05B 19/401*    (2006.01)
*G05B 19/418*    (2006.01)
*H01L 21/67*    (2006.01)

(52) U.S. Cl.
CPC .......... *G03F 7/705* (2013.01); *G03F 7/70625* (2013.01); *G05B 19/401* (2013.01); *G05B 19/41885* (2013.01); *G05B 2219/37224* (2013.01)

(58) Field of Classification Search
CPC ... G03F 7/705; G03F 7/70625; G05B 19/401; G05B 19/41885; G05B 2219/37224; G05B 2219/32194; G05B 19/41875; H01L 21/67253; H01L 22/12; G06N 20/00
See application file for complete search history.

(56) References Cited

U.S. PATENT DOCUMENTS

| | | | |
|---|---|---|---|
| 7,324,193 B2 | 1/2008 | Lally et al. | |
| 7,394,554 B2 | 7/2008 | Vuong et al. | |
| 7,580,129 B2 | 8/2009 | Yu et al. | |
| 2004/0017574 A1 | 1/2004 | Vuong et al. | |
| 2006/0039598 A1 | 2/2006 | Kim et al. | |
| 2006/0064280 A1 | 3/2006 | Vuong et al. | |
| 2008/0195359 A1* | 8/2008 | Barker | G05B 17/02 703/2 |
| 2012/0323356 A1 | 12/2012 | Dziura et al. | |
| 2013/0110477 A1* | 5/2013 | Pandev | G03F 7/70625 703/2 |

(Continued)

FOREIGN PATENT DOCUMENTS

| KR | 10-2006-0017931 A | 2/2006 |
|---|---|---|
| KR | 10-2006-0072889 A | 6/2006 |

(Continued)

*Primary Examiner* — Nghia M Doan
(74) *Attorney, Agent, or Firm* — Muir Patent Law, PLLC (57) ABSTRACT

A method for monitoring a process variation index includes operations of: obtaining a target parameter to be monitored and a reference parameter used to increase goodness of fit among structural parameters predicted by measuring a structure in a specific location of a wafer; obtaining a reference parameter set in a reference model; and calculating a process variation index capable of confirming a structural change of the structure according to a change in process conditions using the structural parameter and the reference parameter.

18 Claims, 9 Drawing Sheets

(56) References Cited

U.S. PATENT DOCUMENTS

2013/0305206 A1* 11/2013 Pandev ................... H01L 22/20
                                                          716/136
2016/0322267 A1    11/2016 Kim et al.
2019/0072496 A1*  3/2019 Barbu ................. G01N 21/9501
2019/0196445 A1    6/2019 Lee et al.
2020/0135592 A1*  4/2020 Fonseca ................. H01L 22/20

FOREIGN PATENT DOCUMENTS

| KR | 100644390 B1 | 11/2006 |
| KR | 101059427 B1 | 8/2011 |
| KR | 10-2017-0031819 A | 3/2017 |

* cited by examiner

[TABLE 1]

| CLASSIFICATION | PARAMETER | POR | PWQ | ALLOWABLE RANGE |
|---|---|---|---|---|
| TARGET PARAMETER (TP) | HT1 | 30 | 30 | −15 ~ +15 |
| REFERENCE PARAMETER (RP) | CD1 | 20 | 25 | −10 ~ +10 |
| | CD2 | 15 | 10 | −10 ~ +10 |
| | HT2 | 320 | 320 | −100 ~ +100 |

METHOD FOR MONITORING PROCESS VARIATION INDEX

CROSS-REFERENCE TO RELATED APPLICATION

This application claims benefit of priority to Korean Patent Application No. 10-2021-0075512 filed on Jun. 10, 2021, in the Korean Intellectual Property Office, the disclosure of which is incorporated herein by reference in its entirety.

BACKGROUND

1. Field

Embodiments relate to a method for monitoring a process variation index.

2. Description of the Related Art

A semiconductor process for manufacturing a semiconductor device includes various processes such as a deposition process, an etching process, and a polishing process, and various semiconductor devices and wirings connecting the semiconductor devices may be formed by the semiconductor process. In addition, after each process is completed, a verification operation for determining structural and/or physical parameters of a structure may be performed. Goodness of Fit (GOF) may correspond to a remainder between measurement data and predicted data, and accuracy of structural and/or physical parameters of a structure may be determined using the GOF.

SUMMARY

According to an aspect, a method for monitoring a process variation index includes operations of: obtaining a target parameter to be monitored and a reference parameter used to increase goodness of fit among structural parameters predicted by measuring a structure in a specific location of a wafer; obtaining a reference parameter set in a reference model; and calculating a process variation index capable of confirming a structural change of the structure according to a change in process conditions using the structural parameter and the reference parameter.

According to an aspect, a method for monitoring a process variation index includes operations of: obtaining measurement data obtained from a structure sampled in a specific location of a wafer and a structural parameter obtained as a result of structural analysis of the structure as training data; training a machine learning model using the machine learning model; predicting a structural parameter from measurement data obtained from the structure using the trained machine learning model; obtaining a structural parameter set in a reference model as a reference parameter; and calculating a process variation index capable of confirming a structural change of the structure using the predicted structural parameter and the reference parameter.

According to an aspect, a method of monitoring a process variation index includes operations of: obtaining a structural parameter predicted by measuring a structure in a specific location of a wafer, a reference parameter set in a reference model, and an allowable range set in the reference model; and calculating a process variation index capable of confirming a structural change of the structure according to a change in process conditions using the structural parameter, the reference parameter, and the allowable range, wherein the allowable range is a numerical range of a structural parameter set in advance in the reference model, wherein the reference model is a model based on parameters obtained as a result of structural analysis of a structure sampled in a specific location of the wafer.

BRIEF DESCRIPTION OF DRAWINGS

Features will become apparent to those of skill in the art by describing in detail example embodiments with reference to the attached drawings in which.

DETAILED DESCRIPTION

Figure 1:
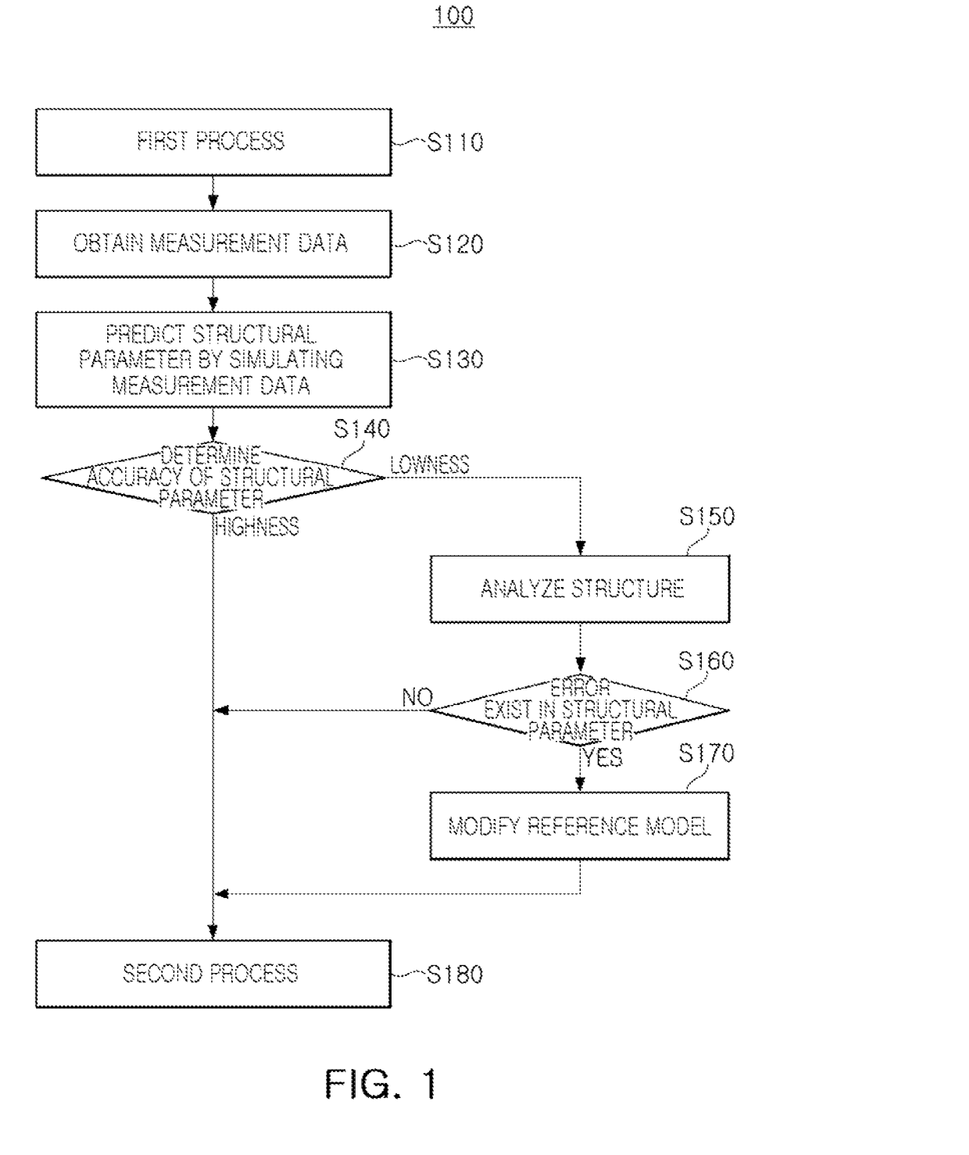
FIG. 1 a flowchart provided to illustrate a method of manufacturing a semiconductor device according to an example embodiment.

FIG. 1 is a flowchart provided to illustrate a method of manufacturing a semiconductor device according to an example embodiment.

Referring to FIG. 1, in order to manufacture a semiconductor device, a first process S110 and a second process S180 may be performed. The first process S110 may be an etching process, and the second process S180 may be an ion implantation process. The etching process may be a process of making a semiconductor circuit pattern after selectively removing unnecessary portions from a wafer using a liquid or gas etchant. A circuit is formed by leaving a photoresist portion formed in the photo process and peeling off the remaining portion using an etchant. The ion implantation process may be a process in which a semiconductor is provided with electrical properties by implanting impurities (ions) into a silicon wafer. Manufacturing the semiconductor device may also include, e.g., a deposition process, which may include a series of processes of coating a thin film of a desired molecular or atomic unit on a wafer. The thin film formed through the deposition process may be largely divided into a metal film (conductive) layer connecting electrical signals between circuits, and an insulating film layer electrically separating an internal connection layer or blocking the same from a contamination source.

In the method of manufacturing a semiconductor device according to the present example embodiment, a verification operation may be performed after the first process S110 is completed and before the second process S160 is performed.

A reference model is generated for each process. For example, generating the reference model for each process may include obtaining measurement data by measuring a structure (and/or measuring physical properties of the structure) at a specific location of a wafer after the respective process is completed, followed by creating a simulation of the measurement data, and then predicting a parameter to be monitored using the simulation of the measurement data. Thus, the reference model may be a model that is generated based on parameters that are obtained as a result of structural analysis of a structure sampled in a specific location of a wafer.

Further to the above, the structural analysis may refer to, e.g., measuring an actual structure from a cross-section of the structure using a scanning electron microscope (SEM), a transmission electron microscope (TEM), or the like. The structural analysis may also refer to, e.g., confirming electrical properties (e.g., resistance and a threshold voltage) of a final semiconductor chip using SEM, TEM, or the like from the cross-section of the final semiconductor chip that has been finished.

Hereinafter, a verification operation will be described in detail.

The verification operation may start by obtaining measurement data (S120). The measurement data may be data, e.g., a measurement image or a measured spectrum, regarding a structure in a specific location of a wafer.

For example, when the measurement data is the image, the measurement image may be acquired using SEM (scanning electron microscopy) or TEM (transmission electron microscopy) (i.e., the image may be an SEM image or a TEM image, respectively).

As another example, when the measurement data is the measured spectrum, the measured spectrum may be acquired using a thickness measuring device such as a spectroscopic ellipsometer or a spectroscopic reflectometer. The thickness measuring device may be, e.g., an optical critical dimension (OCD) measuring device.

In a manufacturing method according to an example embodiment, measurement data may be simulated using a simulation tool, and a structural parameter representing a structure may be predicted from the simulation result (S130), e.g., from the simulated measurement data. The structural parameter is a parameter that represents information of a structure in a specific location on a wafer, and, e.g., the structural parameter may refer to a line width of a structure, a thickness of a structure, the number of holes in a structure, the number of lines of a structure, etc.

The simulation tool may identify structural parameters that are set in a reference model, and may simulate a measured spectrum by adjusting the structural parameters. The simulation tool may obtain a predicted spectrum from a simulation model that is generated as a result of simulating the measured spectrum, and may adjust a structural parameter until a difference between the predicted spectrum and the measured spectrum is equal to or less than a threshold difference. The threshold difference may be set based on goodness of fit (GOF), the GOF may correspond to a remainder or difference between the measurement data and the predicted data, and a fitting operation (of adjusting the structural parameter to offset the difference between the measurement data and the predicted data) may be performed.

Figure 2:
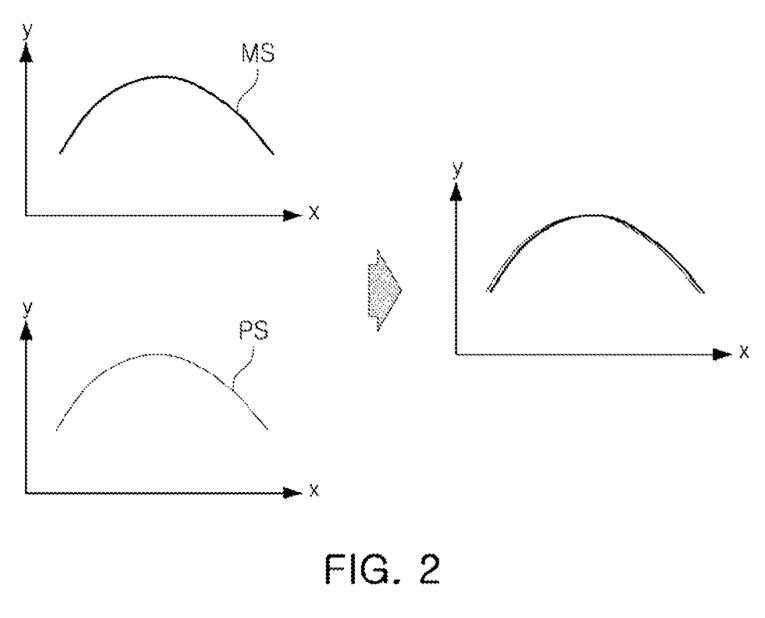
FIG. 2 is a diagram provided to illustrate a GOF according to an example embodiment.

FIG. 2 is a diagram provided to illustrate GOF according to an example embodiment.

In FIG. 2, an x-axis represents a wavelength of a signal, and a y-axis represents a strength or intensity of a signal.

Referring to FIG. 2, a measured spectrum MS is a spectrum obtained from a structure in a specific location of a wafer, and a predicted spectrum PS is a spectrum obtained from a simulation model generated as a result of simulating the measured spectrum.

GOF may mean a constant that indicates how close the measured spectrum MS and the predicted spectrum PS are to each other when a simulation tool completes an adjustment of the structural parameter. The most ideal case is when the GOF has a '1' indicating that the measured spectrum MS and the predicted spectrum PS match perfectly.

Returning to FIG. 1, in the manufacturing method according to the present example embodiment, when the adjustment of the structural parameters is completed, accuracy of the adjusted structural parameters may be determined (S140). For example, it may be determined that the accuracy of the structural parameter is lower as the GOF is closer to zero. Conversely, it may be determined that the accuracy of the structural parameter is higher as the GOF is closer to 1.

If it is determined that the accuracy of the structural parameter is low (lowness in S140), then structural analysis may be performed (S150).

As a result of the structural analysis (S150), if it is determined that there is an error in the predicted structural parameter (YES in S160), a reference model is modified (S170), and a following process may be performed (S180). Conversely, as a result of the structural analysis, if it is determined that there is no error in the predicted structural parameters (NO in S160), the following process may be performed without modifying the reference model (S180).

If it is determined that the accuracy of the structural parameter is high (highness in S140), then a following process may be performed (S180).

As a general matter, even in a same semiconductor process, semiconductor devices having different properties may be formed according to process conditions. For example, even for devices formed by a same photo process and etching process, structural properties of the structure may vary according to differences in process conditions. Thus, the structural parameter of the structure may also change according to changes in process conditions. However, determining the accuracy of the structural parameters using the GOF indicating goodness of fit of the measured spectrum and the predicted spectrum may not reflect the change in structural properties of the structure according to the change in process conditions.

On the other hand, a method according to an example embodiment predicts a change in structural properties according to a change in process conditions in advance. For example, in a method according to an example embodiment, structural parameters set in a reference model may be obtained as reference parameters, and a process variation index capable of confirming a change in structural properties of a structure according to a change in process conditions may be calculated using measurement parameters and reference parameters. The measurement parameter may include a parameter to be monitored in a corresponding process as well as a parameter used to increase goodness of fit (GOF). A change in process conditions may be recognized in advance using the process variation index.

In addition, a machine learning model may be pre-trained using a structural parameter obtained through structural analysis, and the machine learning model (on which learning or training is completed) may be provided as a simulation tool for predicting the structural parameter. The machine learning model may be trained using, e.g., a deep learning algorithm, or the like. The machine learning model may include, e.g., an artificial neural network implemented as a fully connected network and a convolution neural network.

A process variation index may be calculated using output data that is output while training the machine learning model, and the calculation result may be modified or added to the training data used for learning or training the machine learning model. Therefore, it is possible to accurately predict the structural properties of the structure.

Figure 3:
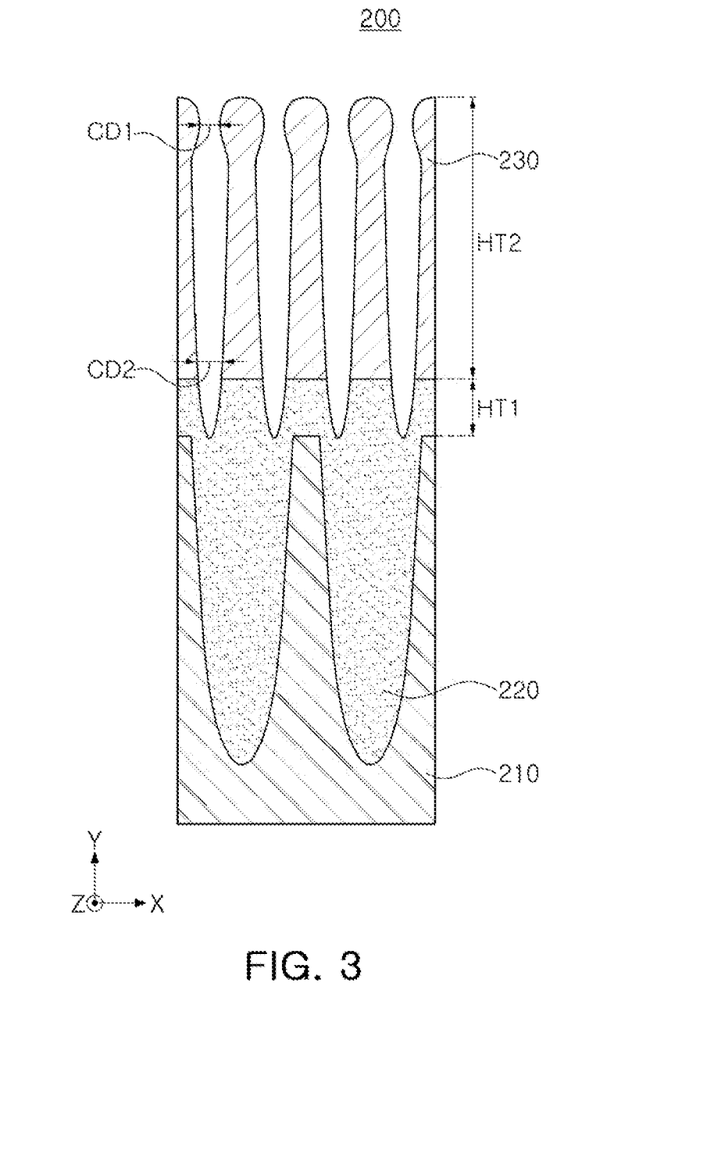
FIG. 3 is a diagram illustrating an OCD-based simulation model according to an example embodiment.

FIG. 3 is a diagram illustrating an OCD-based simulation model according to an example embodiment.

Referring to FIG. 3, an OCD-based simulation model 200 may be obtained by generating a measured spectrum for a structure in a specific location on a wafer using an OCD measuring device, and simulating the measured spectrum using a simulation tool.

The structure may be a structure generated after an etching process. For example, an oxide film (e.g., $SiO_2$) 220 serving as an insulating film may be formed on a silicon substrate 210 in an oxidation process. Thereafter, a photoresist (PR) 230, which is a light-sensitive material, may be applied to a surface of the wafer in a photo process, and a circuit may be printed on the wafer by passing light through a mask containing a circuit pattern. Thereafter, in an etching process, a semiconductor circuit pattern may be formed after selectively removing unnecessary portions using a liquid or gaseous etchant on the wafer.

The simulation model 200 may include a first critical dimension CD1, a second critical dimension CD2, a first height HT1, and a second height HT2.

The first critical dimension CD1 may be an upper line width of the photoresist 230, and the second critical dimension CD2 may be a lower line width of the photoresist 230. The line width may include a space critical dimension and a bar critical dimension. The space critical dimension may be a distance between adjacent pattern structures in pattern structures, and the bar critical dimension may be a width of the pattern structures.

The first height HT1 may be a thickness of a recess, and the second height HT2 may be a thickness of the photoresist 230.

The first height HT1 indicates how much is etched in a first direction (e.g., a Y-axis direction) perpendicular to the silicon substrate 210 from an upper surface of the oxide film. Properties of the product may be subsequently determined or affected by the first height HT1. For example, when a metal wiring is formed by filling the recess with metal, a resistance value may be determined according to the thickness of the recess. If the resistance value is too large, heat generated in the semiconductor device may increase, and thus defects of the semiconductor device may occur.

Accordingly, the first height HT1 may be a structural parameter to be monitored in the etching process. The first critical dimension CD1, the second critical dimension CD2, and the second height HT2 may be structural parameters used to increase GOF when simulating the measured spectrum.

According to an example embodiment, not only can the structural parameters to be monitored be acquired from a simulation tool, but also the structural parameters used to increase the GOF when simulating the measured spectrum may be acquired from the simulation tool. Using all the structural parameters obtained from the simulation tool (i.e., the structural parameters to be monitored, as well as the structural parameters used to increase the GOF when simulating the measured spectrum), it is possible to calculate a process variation index capable of confirming a change in structural properties of a structure according to a change in process conditions. A change in process conditions may be recognized in advance using the process variation index.

Figure 4:
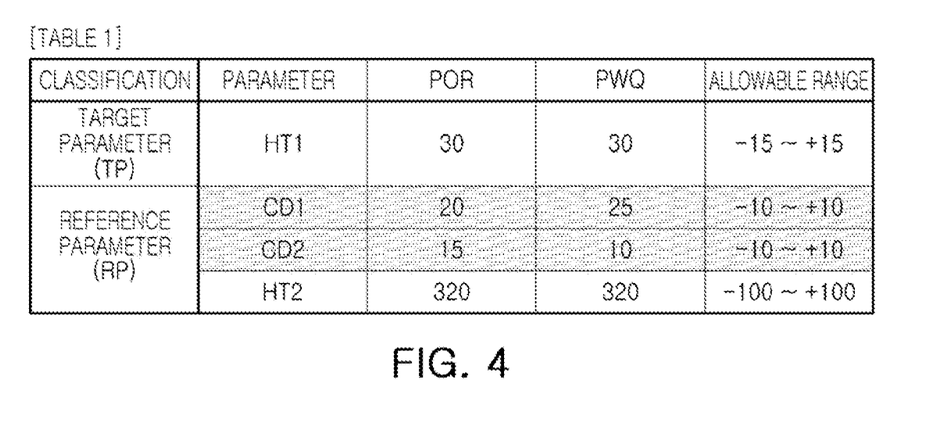
FIG. 4 is a table provided to illustrate a change in structural properties according to a change in process conditions according to an example embodiment.
Figure 5:
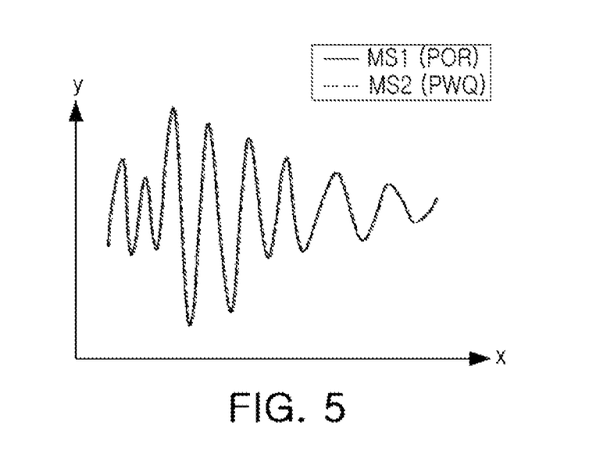
FIG. 5 is a graph corresponding to the table of FIG. 4.

FIG. 4 is a table provided to illustrate a change in structural properties according to a change in process conditions according to an example embodiment, and FIG. 5 is a graph corresponding to the table of FIG. 4

Referring to FIG. 4, Table 1 illustrates structural parameters obtained from structures formed under different process conditions. A target parameter TP may mean a parameter to be monitored in a corresponding process, and a reference parameter RP may refer to parameters used to increase the GOF when simulating a measured spectrum.

For a process of reference (POR), a first process condition may mean a reference process condition, and for a process window qualification (PWQ), a second process condition may mean a process condition applied to evaluate the first process condition POR. That is, the second process condition PWQ may mean an improved process condition in a direction to increase a yield. The process conditions may be temperature, pressure, plasma conditions, and the like. An allowable range may mean a numerical range of a structural parameter preset in the reference model.

In Table 1, a first height HT1 corresponding to a structure formed under the first process condition POR and a first height HT1 corresponding to a structure formed under the second process condition PWQ may be equal to each other. Further, a second height HT2 corresponding to a structure formed under the first process condition POR and a second height HT2 corresponding to a structure formed under the second process condition PWQ may be equal to each other.

However, the first critical dimension CD1 corresponding to the structure formed under the first process condition POR and the first critical dimension CD1 corresponding to the structure formed under the second process condition PWQ may be different from each other. Likewise, the second critical dimension CD2 corresponding to the structure formed under the first process condition POR and the second critical dimension CD2 corresponding to the structure formed under the second process condition PWQ may be different from each other.

In FIG. 4, an example embodiment in which the first critical dimension CD1 corresponding to the structure formed under the second process condition PWQ and the second critical dimension CD2 corresponding to the structure formed under the second process condition PWQ are within an allowable range is illustrated, whereas the first critical dimension CD1 corresponding to the structure formed under the second process condition PWQ and the second critical dimension CD2 corresponding to the structure formed under the second process condition PWQ may deviate from an allowable range.

FIG. 5 is a graph illustrating a first measured spectrum MS1 and a second measured spectrum MS2.

Referring to the graph in FIG. 5, the first measured spectrum MS1 and the second measured spectrum MS2 represent measurement spectra obtained from structures formed under different process conditions. In an example, the first measured spectrum MS1 is a measured spectrum obtained from a structure formed under the first process condition POR, and the second measured spectrum MS2 is a measured spectrum obtained from a structure formed under the second process condition PWQ.

Structural parameters corresponding to the structure formed under the first process condition POR of FIG. 4 may be structural parameters predicted by simulating the first measured spectrum MS1 of FIG. 5. Structural parameters corresponding to the structure formed under second process condition PWQ of FIG. 4 may be structural parameters predicted by simulating the second measured spectrum MS2 of FIG. 5.

Referring to FIG. 4, when a process condition is changed from the first process condition POR to the second process condition PWQ, structural properties of the structure may vary according to a difference in the process conditions. If the structural properties of the structure change, a shape of the measured spectrum may also change.

As a general matter, when the shape of the measured spectrum is changed, a structural change may occur in the simulation model that is generated by simulating the measured spectrum. When a structural change occurs in the simulation model, a shape of the predicted spectrum obtained from the simulation model changes. Accordingly, the GOF corresponding to a remainder or difference of the measured spectrum and the predicted spectrum may also change. However, as shown in FIG. 5, even if the process conditions are changed, a shape of the first measured spectrum MS1 and a shape of the second measured spectrum MS2 may be the same or similar, and when the shape of the first measured spectrum MS1 and the shape of the second measured spectrum MS2 are the same or similar, the GOF may be the same or similar. Therefore, when changes in the structural properties of the structure occur according to the change in process conditions, the shape of the measured spectrum may nonetheless be similar, and thus the change in the structural properties of the structure according to the change in process conditions may not be recognized only by the GOF.

On the other hand, according to an example embodiment, it is possible to calculate a process variation index capable of confirming a change in structural properties of a structure according to a change in process conditions. Therefore, even if a change in structural properties of a structure according to a change in process conditions is not recognized using a GOF, a change in structural properties of a structure according to a change in process conditions may be confirmed in advance using the process variation index. Accordingly, the change in process conditions may be recognized in advance.

Figure 6:
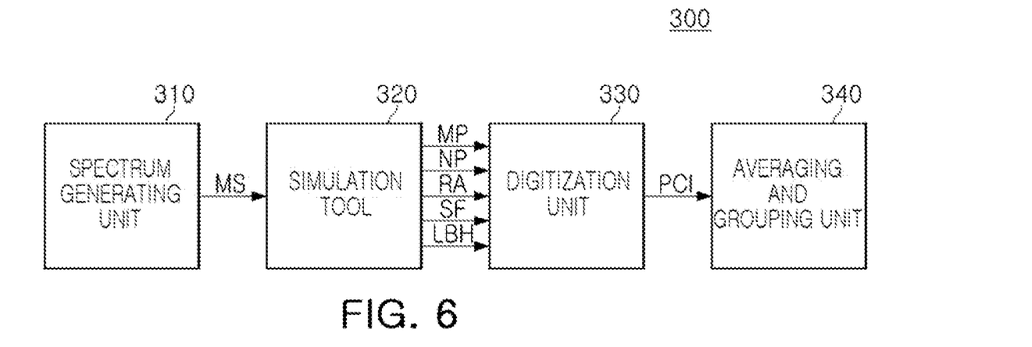
FIGS. 6 and 7 are diagrams provided to illustrate a method of monitoring a process variation index of a semiconductor process according to an example embodiment.
Figure 7:
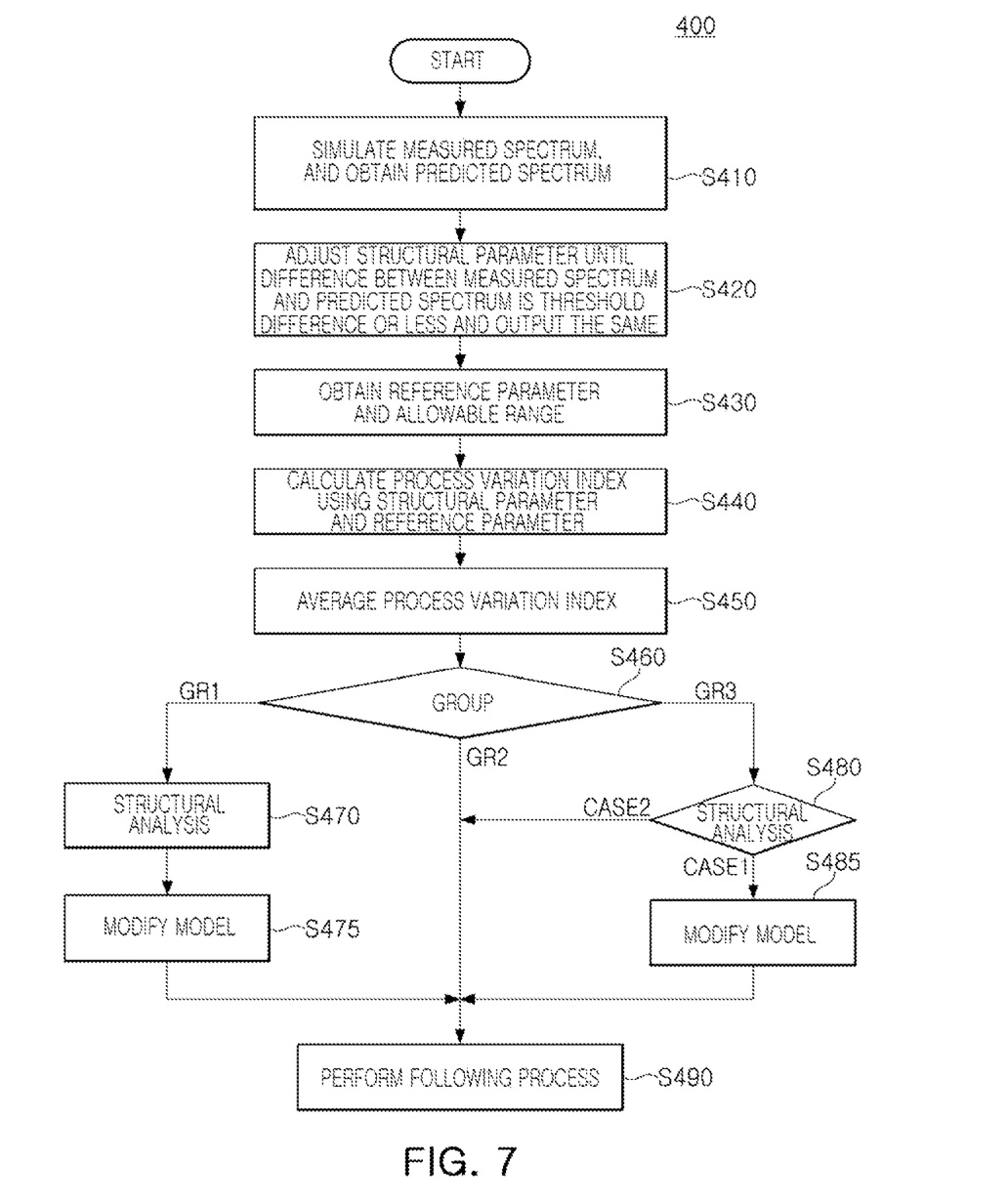

FIGS. 6 and 7 are diagrams provided to illustrate a method of monitoring a process variation index according to an example embodiment.

Referring to FIG. 6, a process variation index monitoring system 300 may include a spectrum generator 310, a simulation tool 320, a digitization unit 330, and an averaging and grouping unit 340.

Each of the simulation tool 320 and the digitization unit 330 may be provided by software or a combination of specific hardware and computer instructions for performing a corresponding function.

A process variation index may be calculated by receiving a measured spectrum MS obtained from the spectrum generator 310. The averaging and grouping unit 340 may group structures using the process variation index.

Referring to 6 and 7 together, the spectrum generator 310 may be SE, SR, or the like. The spectrum generator 310 may obtain a measured spectrum MS from a structure in a specific location on a wafer. The spectrum generator 310 may output the obtained measured spectrum MS. The simulation tool 320 may receive the measured spectrum MS from the spectrum generator 310.

The simulation tool 320 may simulate the measured spectrum MS to predict a structural parameter MP representing a structure. For example, the simulation tool 320 may identify structural parameters from a reference model, and adjust the identified structural parameters to simulate the measured spectrum MS.

The simulation tool 320 may obtain a predicted spectrum from a simulation model generated as a result of simulating the measured spectrum MS (S410).

The simulation tool 320 may adjust the structural parameters until a difference between the measured spectrum MS and the predicted spectrum becomes less than or equal to a threshold difference, and when an adjustment of the structural parameters is completed, the adjusted structural parameters MP may be output (S420).

The digitization unit 330 may receive a structural parameter MP, a reference parameter NP, and an allowable range RA from the simulation tool 320 (S430). The reference parameter NP may be a structural parameter preset in a reference model. The digitization unit 330 may calculate a process variation index PCI using the structural parameter MP, the reference parameter NP, and the allowable range RA (S440).

According to an example embodiment, the digitization unit 330 may further receive a scale factor SF and a limit boundary hit LBH from the simulation tool 320.

The digitization unit 330 may calculate a process variation index PCI using the structural parameter MP, the reference parameter NP, the allowable range RA, the scale factor SF, and the LBH. For example, the digitization unit 330 may calculate the process variation index PCI using [Equation 1].

$$PCI = \left(1 - \frac{MP1 - NP1}{RA1}\right) \cdot \left(1 - \frac{MP2 - NP2}{RA2}\right) \ldots SF \cdot RL \quad \text{[Equation 1]}$$

In Equation 1, MPi (e.g., MP1, MP2, etc.) denotes a predicted ith structural parameter, NPi (e.g., NP1, NP2, etc.) denotes a reference parameter preset in a reference model and corresponding to the ith structural parameter, RAi (e.g., RA1, RA2, etc.) is preset in a reference model and denotes an allowable range for the ith structural parameter, SF denotes a scale factor, and RL denotes whether the ith structural parameter deviates from an allowable range.

In addition, a magnitude of the GOF varies depending on how the reference model is generated, and the scale factor SF refers to a constant multiplied to make the size of the GOF within a certain range.

The range limit RL denotes whether the structural parameter deviates from the allowable range RA. If the structural parameter deviates from the allowable range RA, a value of the LBH may be '−1', '0', or '1' according to equipment specifications. Therefore, the RL may be calculated using Equation 2 to Equation 4.

$$RL1 = 1 - LBH \quad \text{[Equation 2]}$$

$$RL2 = LBH \quad \text{[Equation 3]}$$

$$RL3 = -1 + (-1 \cdot LBH) \quad \text{[Equation 4]}$$

Equation 2 may be used if the LBH is '1' when the structural parameter deviates from the allowable range RA.

Equation 3 may be used if the LBH is '0', when the structural parameter deviates from the allowable range RA.

Equation 4 may be used if the LBH is '−1' when the structural parameter deviates from the allowable range RA.

Figure 8:
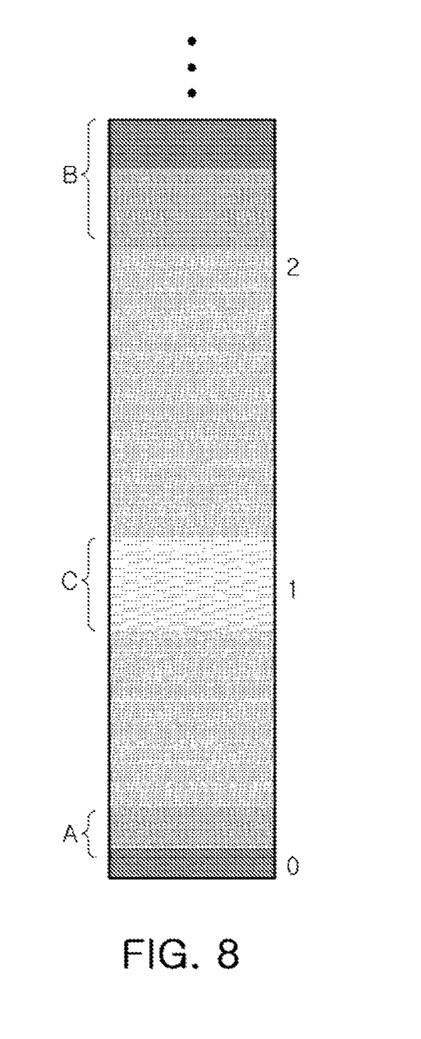
FIG. 8 is a view illustrating a process variation index according to an example embodiment.

FIG. 8 is a view for illustrating a process variation index according to an example embodiment.

Referring to FIG. 8, the process variation index may be a numerical value of a change in structural properties of a structure according to a change in process conditions. For example, if the process variation index is '0', it may mean that at least one of the structural parameters deviates from an allowable range. If at least one of the structural parameters deviates from an allowable range, it means that the structural change of the structure has occurred to an unpredictable extent of the structural parameters, and a following process may be performed after a reference model is corrected.

The closer the process variation index is to '1' (region C), the more similar the structure of the actual structure to the reference model. Therefore, it means that there is no structural change of the structure or there is little structural change of the structure, and a following process may be performed without modifying the reference model.

When the process variation index is close to '0' (region A) or is equal to or greater than 2 (region B), it may mean that the structural change of the structure is large. For example, it may mean that structural parameters vary significantly within an allowable range. Accordingly, it is possible to obtain actual structural parameters of a corresponding structure through structural analysis, compare the actual structural parameters with predicted structural parameters, and determine whether to modify a reference model based on the comparison result. For example, as a result of the structural analysis, if it is determined that a structural change of the structure has actually occurred due to a change in process conditions, a reference model for performing a following process may be modified based on a result of structural analysis, and the next process may be performed. As a result of the structural analysis, if it is determined that the structural change of the structure has not actually occurred or that the structural change is small, the following process may be performed without modifying the reference model.

Referring back to FIGS. 6 and 7, the averaging and grouping unit 340 may receive process variation indices PCI corresponding to a plurality of structures at a plurality of positions of each of a plurality of wafers from the digitization unit 330. The averaging and grouping unit 340 may calculate an average value by averaging the process variation indices PCI (S450). The averaging and grouping unit 340 may group the plurality of structures using the average value of the process variation indices PCI (S460).

Figure 9A:
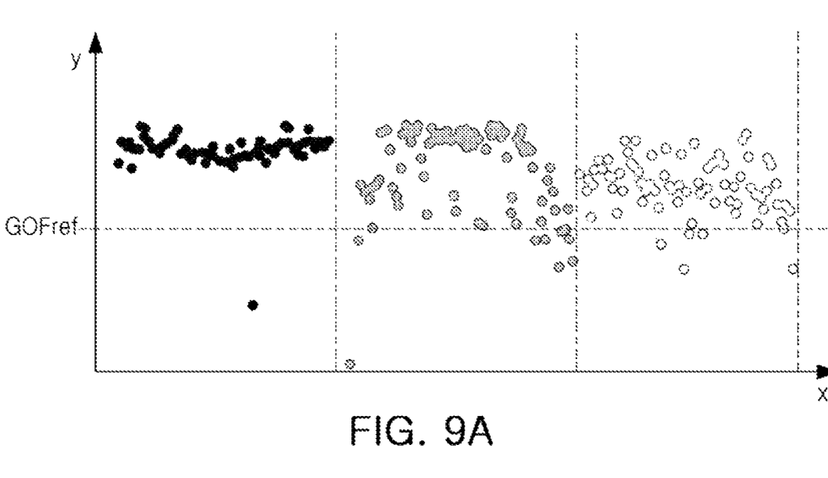
FIGS. 9A and 9B are diagrams illustrating grouping according to an example embodiment.
Figure 9B:
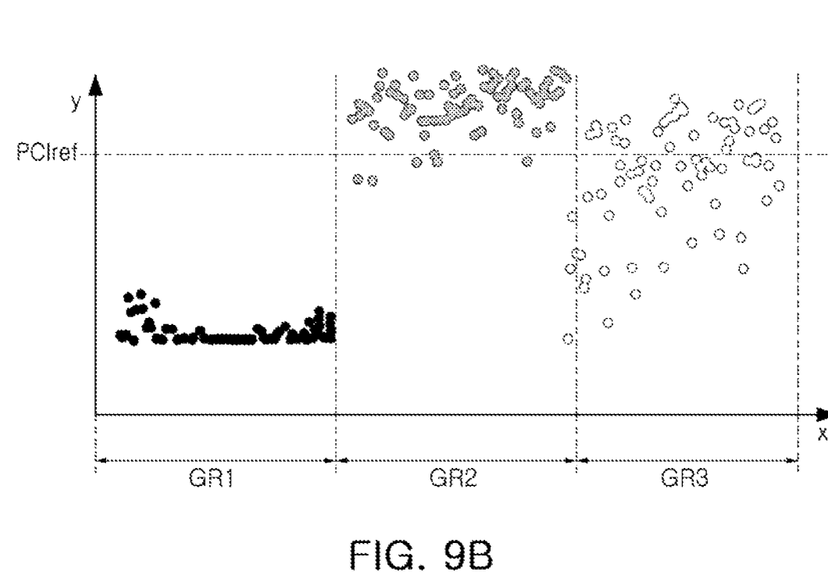

FIGS. 9A and 9B are diagrams for illustrating grouping according to an example embodiment.

An x-axis of each of FIG. 9A and FIG. 9B represents a location of a structure. A y-axis of FIG. 9A represents GOF. A y-axis of FIG. 9B represents a process variation index.

When an average value of the process variation indices PCI is close to '0', the structures may be classified into a first group GR1. When the average value of the process variation indices PCI is equal to or greater than a reference index PCIref, the structures may be classified into a second group GR2. When the average value of the process variation indices PCI is less than a reference index PCIref, the structures may be classified into a third group GR3. In all of the first group GR1, the second group GR2, and the third group GR3, the average value of the GOF may be equal to or greater than a fitting index GOFref.

That is, even if the average value of the GOF satisfies the fitting index GOFref in all of the first group GR1, the second group GR2, and the third group GR3, the average value of the process variation indices PCI of each of the first group GR1, the second group GR2, and the third group GR3 may be different.

Therefore, according to an example embodiment, even if the structural change of the structure according to the change in process conditions is not recognized only by the GOF, the structural change of the structure according to the change in the process conditions may be confirmed using the process variation index PCI.

Accordingly, a change in process conditions may be recognized in advance.

Referring back to FIGS. 6 and 7, structures classified into the first group GR1 may indicate that the structural parameter deviates from an allowable range RA set in a reference model.

When the structural parameter is outside the allowable range RA set in the reference model, since it means that the structural change of the structure has occurred to an extent that the structural parameter cannot be predicted, through structural analysis (S470), an actual structural parameter of a corresponding structure may be obtained, a reference model may be obtained, and the reference model may be corrected based on a structural parameter obtained as a result of the structural analysis (S475), and a following process may be performed (S490) Since the structures classified into the second group GR2 mean that no structural change has occurred or the structural change is small, a following process may be performed without modifying the reference model (S490).

Structures classified into the third group GR3 may mean that a structural change of the structure is large according to a change in process conditions.

Accordingly, it is possible to obtain actual structural parameters of a corresponding structure through structural analysis (S480), compare the actual structural parameters with predicted structural parameters, and determine whether to modify a reference model based on the comparison result.

As a result of the structural analysis, if it is determined that the structural change of the structure has actually occurred according to a change in process conditions (CASE1 of S480), a reference model for performing a following process may be modified (S485), and the following process may be performed (S490).

As a result of the structural analysis, if it is determined that the structural change of the structure has not actually occurred or that the structural change is small (CASE2 of S480), a following process may be performed without modifying the reference model (S490).

Figure 10:
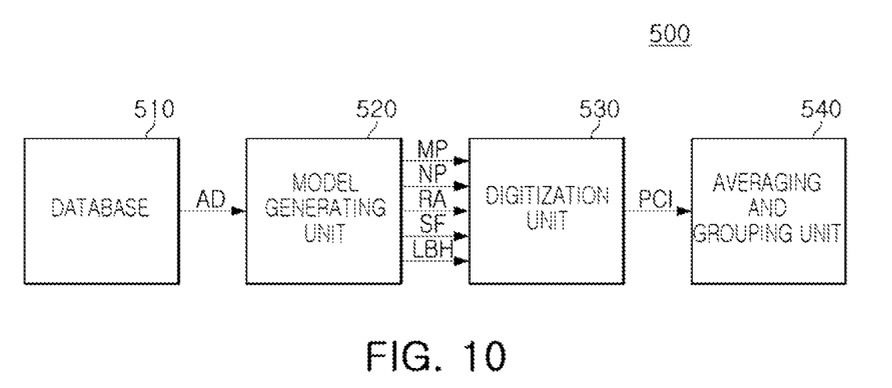
FIGS. 10 and 11 are diagrams provided to illustrate a method for training a machine learning model according to an example embodiment.
Figure 11:
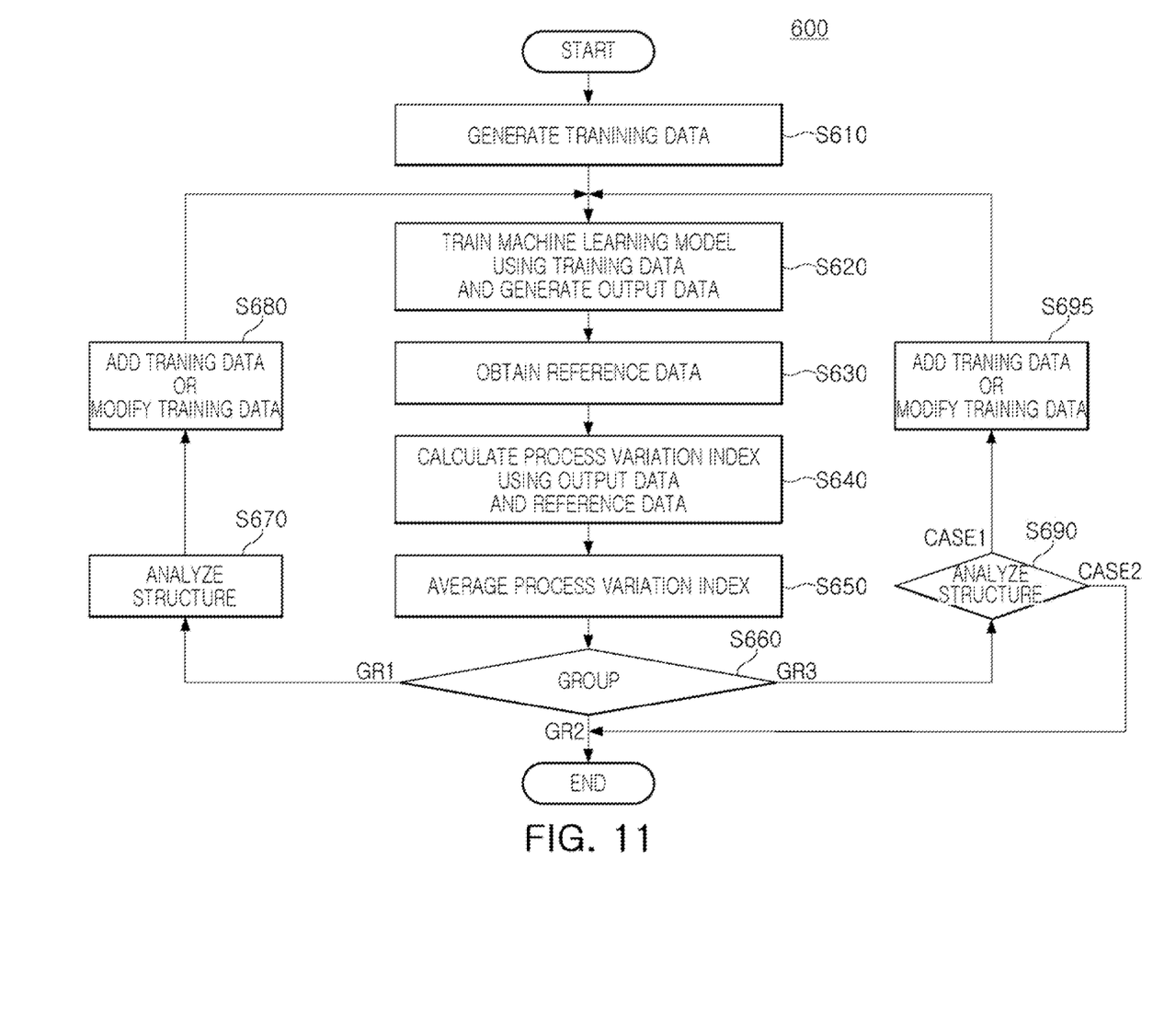

FIGS. 10 and 11 are diagrams provided to illustrate a method for training a machine learning model according to an example embodiment.

Referring to FIGS. 10 and 11 together, a system 500 for learning a machine learning model may include a database 510, a model generating unit 520, a digitization unit 530, and an averaging and grouping unit 540.

The model generating unit 520 may receive training data AD from the database 510, and may train the machine learning model using the training data AD. The training data AD may be composed of a pair of a measured spectrum obtained using SE, SR, or the like from a structure sampled in a specific location of a wafer, and a structural parameter obtained as a result of structural analysis of the structure.

The model generating unit 520 may obtain the training data AD as input data. The model generating unit 520 may train a machine learning model using the training data AD.

The digitization unit 530 may obtain output data MP, and may output reference data NP, an allowable range RA, a scale factor SF, and a LBH from the machine learning model while the machine learning model is trained (S620).

The output data MP may mean a value obtained by predicting a structural parameter of a structure in a specific location of a wafer, and the reference data NP may mean a structural parameter set in a reference model in advance. The digitization unit 530 may calculate a process variation index PCI using output data MP, reference data NP, an allowable range RA, a scale factor SF, and a LBH (S640).

The averaging and grouping unit 540 may receive process variation indices (PCIs) corresponding to a plurality of structures at a plurality of positions of each of the plurality of wafers from the digitization unit 530. The averaging and grouping unit 540 may calculate an average value by averaging the process variation indices PCI (S650).

The averaging and grouping unit 540 may group the plurality of structures using an average value of the process variation indices PCI (S660). For example, when the average value of the process variation indices PCI is close to 0, a plurality of structures may be classified into a first group GR1. When the average value of the process variation indices PCI is close to '0', the structures may be classified into a first group GR1. Structures classified into the first group GR1 may indicate that the structural parameter deviates from an allowable range RA set in a reference model. Accordingly, actual structural parameters of a corresponding structure may be obtained through structural analysis (S670), training data may be modified based on the structural parameters obtained as a result of the structural analysis, and training may be performed again (S620). In addition, the modified training data may be added to the existing training data (S680), and training may be performed again (S620).

When an average value of the process variation indices PCI is equal to or greater than a reference index PCIref, the structures may be classified into a second group GR2. Since the structures classified into the second group GR2 mean that the structural change of the structure does not occur or the structural change is small, the training may be terminated.

When an average value of the process variation indices PCI is less than a reference index PCIref, a plurality of structures may be classified into a third group GR3. Structures classified into the third group GR3 may mean that a structural change of the structure is large according to a change in process conditions. Accordingly, it is possible to obtain actual structural parameters of a corresponding structure through structural analysis (S680), compare the actual structural parameters with predicted structural parameters, and determine whether to modify the training data based on the comparison result.

As a result of structural analysis, if it is determined that the structural change of the structure has actually occurred according to the change in process conditions (CASE1 of S690), training data may be corrected based on the result of structural analysis (S695), and learning may be performed again (S620). In another example embodiment, the modified training data may be added to the existing training data (S695), and learning may be performed again (S620). As a result of structural analysis, if it is determined that the structural change of the structure has not actually occurred or that the structural change is small (CASE2 of S690), the learning may be terminated.

Herein, example embodiments for recognizing a change in process conditions in advance by calculating a process variation index that can confirm a change in structural properties of a structure according to a change in process conditions in advance have been illustrated and described. According to example embodiments, a change in process conditions may be recognized in advance by calculating a process variation index that can confirm in advance a change in physical properties of a structure according to a change in process conditions.

As set forth above, according to an example embodiment, by recognizing a change in structural or physical properties according to a change in process conditions in advance, a change in process conditions may be recognized in advance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for monitoring a process variation index, the method comprising operations of:

performing a first process on a wafer to manufacture a semiconductor device;

obtaining measurement data regarding a structure in a specific location of the wafer which is obtained after performing of the first process;

predicting structural parameters by simulating the measurement data using a simulation tool, wherein the structural parameters are predicted by measuring the structure in the specific location of the wafer;

obtaining a target parameter to be monitored;

obtaining a reference parameter used to increase goodness of fit from among the structural parameters, wherein the reference parameter is set in a reference model;

calculating the process variation index, which is capable of confirming a structural change of the structure according to a change in process conditions, using the target parameter and the reference parameter, wherein the process variation index satisfies the following equation:

$$PCI = \left(1 - \frac{MP1 - NP1}{RA1}\right) \cdot \left(1 - \frac{MP2 - NP2}{RA2}\right) \ldots SF \cdot RL$$

wherein MP1 and MP2 denote predicted structural parameters, NP1 and NP2 denote reference parameters, which are preset in the reference model and correspond to the predicted structural parameters, respectively, RA1 and RA2 denote allowable ranges preset in the reference model and correspond to the predicted structural parameters, respectively, SF denotes a scale factor to make a magnitude of goodness of fit (GOF) within a certain range, RL denotes whether a respective one of the predicted structural parameters deviates from an allowable range and a range limit indicating whether a structural parameter deviates from the allowable range;

obtaining process variation indices corresponding to a plurality of structures at a plurality of locations on each of a plurality of wafers;

calculating an average value by averaging the process variation indices; and depending on the average value, performing a second process to manufacture the semiconductor device, or modifying the reference model.

2. The method for monitoring the process variation index of claim 1, wherein the operation of predicting the structural parameters includes operations of:

obtaining predicted data from a simulation model, which is generated as a result of simulating the measurement data; and adjusting the structural parameters until a difference between the measurement data and the predicted data is less than or equal to a threshold difference.

3. The method for monitoring the process variation index of claim 2, further comprising operations of:

grouping the plurality of structures into a plurality of groups using the average value.

4. The method for monitoring the process variation index of claim 2, further comprising an operation of determining whether to modify the reference model through a structural analysis, when the average value of the process variation indices is less than a reference index.

5. The method for monitoring the process variation index of claim 1, further comprising an operation of modifying the reference model through a structural analysis, when at least one of the structural parameters deviates from a corresponding allowable range of the allowable ranges that are set in the reference model.

6. The method for monitoring the process variation index of claim 1, wherein the target parameter includes a line width and a thickness of the structure.

7. A method for monitoring a process variation index, the method comprising operations of:

performing a first process on a wafer to manufacture a semiconductor device;

obtaining first measurement data, which is obtained from a structure sampled in a specific location of the wafer;

obtaining a structural parameter, which is obtained as a result of a structural analysis of the structure;

training a machine learning model using the first measurement data and the structural parameter as training data;

predicting a structural parameter from second measurement data, which is obtained from the structure using the trained machine learning model;

obtaining a structural parameter, which is set in a reference model, as a reference parameter; and calculating the process variation index capable of confirming a structural change of the structure using the predicted structural parameter and the reference parameter, wherein the process variation index satisfies the following equation:

$$PCI = \left(1 - \frac{MP1 - NP1}{RA1}\right) \cdot \left(1 - \frac{MP2 - NP2}{RA2}\right) \ldots SF \cdot RL$$

wherein MP1 and MP2 denote predicted structural parameters, NP1 and NP2 denote reference parameters, which are preset in the reference model and correspond to the predicted structural parameters, respectively, RA1 and RA2 denote allowable ranges preset in the reference model and correspond to the predicted structural parameters, respectively, SF denotes a scale factor to make a magnitude of goodness of fit (GOF) within a certain range, RL denotes whether a respective one of the predicted structural parameters deviates from an allowable range and a range limit indicating whether a structural parameter deviates from the allowable range, and wherein the operation of training the machine learning model includes operations of:

obtaining a plurality of process variation indices using a plurality of output data corresponding to a plurality of structures at a plurality of locations on each of a plurality of wafers; and calculating an average value by averaging the plurality of process variation indices; and depending on the average value, performing a second process to manufacture the semiconductor device, or modifying the reference model.

8. The method for monitoring the process variation index of claim 7, wherein the operation of training the machine learning model includes operations of:

obtaining reference data, which is set in the reference model;

obtaining output data, which is output from the machine learning model while the machine learning model is trained; and calculating the process variation index using the output data and the reference data.

9. The method for monitoring the process variation index of claim 8, wherein the operation of training the machine learning model further includes operations of:

grouping the plurality of structures into a plurality of groups using the average value.

10. The method for monitoring the process variation index of claim 9, wherein the operation of training the machine learning model further includes an operation of:

modifying the training data through a structural analysis, when at least one of the plurality of output data deviates from an allowable range that is set in the reference model.

11. The method for monitoring the process variation index of claim 9, wherein, when the average value is less than a reference index, whether to modify the training data through a structural analysis is determined.

12. The method for monitoring the process variation index of claim 9, wherein the plurality of output data are structural parameters representing structural information of the plurality of structures.

13. A method for monitoring a process variation index, the method comprising operations of:

performing a first process on a wafer to fabricate a semiconductor device;

obtaining a structural parameter, which is predicted by measuring a structure in a specific location of the wafer;

obtaining a reference parameter, which is set in a reference model;

obtaining an allowable range, which is set in the reference model; and calculating the process variation index capable of confirming a structural change of the structure according to a change in process conditions using the structural parameter, the reference parameter, and the allowable range, wherein the process variation index satisfies the following equation:

$$PCI = \left(1 - \frac{MP1 - NP1}{RA1}\right) \cdot \left(1 - \frac{MP2 - NP2}{RA2}\right) \ldots SF \cdot RL$$

wherein MP1 and MP2 denote predicted structural parameters, NP1 and NP2 denote reference parameters, which are preset in the reference model and correspond to the predicted structural parameters, respectively, RA1 and RA2 denote allowable ranges preset in the reference model and correspond to the predicted structural parameters, respectively, SF denotes a scale factor to make a magnitude of goodness of fit (GOF) within a certain range, RL denotes whether a respective one of the predicted structural parameters deviates from an allowable range and a range limit indicating whether a structural parameter deviates from the allowable range, wherein the allowable range is a numerical range of the structural parameter, and is preset in the reference model, and wherein the reference model is a model formed based on parameters obtained as a result of a structural analysis of the structure sampled in the specific location of the wafer;

obtaining process variation indices corresponding to a plurality of structures at a plurality of locations on each of a plurality of wafers;

calculating an average value by averaging the process variation indices;

depending on the average value, performing a second process to manufacture the semiconductor device, or modifying the reference model.

14. The method for monitoring the process variation index of claim 13, further comprising operations of:

obtaining a measured spectrum from the structure in the specific location on the wafer;

identifying a parameter representing structural information set in the reference model;

simulating the measured spectrum by adjusting the parameter, and obtaining a predicted spectrum from a simulation model generated as a result of the simulating of the measured spectrum;

adjusting the parameter until a difference between the measured spectrum and the predicted spectrum is less than or equal to a threshold difference; and obtaining the adjusted parameter as the structural parameter, when the adjustment of the parameter is completed.

15. The method for monitoring the process variation index of claim 14, wherein the threshold difference is set based on goodness of fit (GOF).

16. The method for monitoring the process variation index of claim 13, further comprising operations of grouping the plurality of structures using the average value.

17. The method for monitoring the process variation index of claim 13, further comprising an operation of modifying the reference model through a structural analysis, when the structural parameter deviates from a corresponding allowable range of the allowable ranges that are set in the reference model.

18. The method for monitoring the process variation index of claim 13, further comprising an operation of determining whether to modify the reference model through a structural analysis, when the average value of the process variation indices is less than a reference index.

\* \* \* \* \*